US009088034B2

(12) United States Patent
Ahn et al.

(10) Patent No.: US 9,088,034 B2
(45) Date of Patent: Jul. 21, 2015

(54) SECONDARY BATTERY AND BATTERY PACK USING THE SAME

(75) Inventors: Changbum Ahn, Yongin-si (KR); Youngbae Sohn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 905 days.

(21) Appl. No.: 12/954,350

(22) Filed: Nov. 24, 2010

(65) Prior Publication Data

US 2011/0129702 A1 Jun. 2, 2011

(30) Foreign Application Priority Data

Nov. 26, 2009 (KR) ........................ 10-2009-0115146

(51) Int. Cl.
*H01M 2/12* (2006.01)
*H01M 2/02* (2006.01)
*H01M 10/48* (2006.01)

(52) U.S. Cl.
CPC .......... *H01M 2/1241* (2013.01); *H01M 2/0207* (2013.01); *H01M 10/488* (2013.01); *H01M 2220/20* (2013.01)

(58) Field of Classification Search
CPC .................................................. H01M 2/1241
USPC .................................................. 429/53, 162
See application file for complete search history.

(56) References Cited

U.S. PATENT DOCUMENTS

| 2004/0038126 | A1 | 2/2004 | Gu | |
| 2006/0216594 | A1* | 9/2006 | You et al. ...................... | 429/180 |
| 2008/0241675 | A1* | 10/2008 | Enari et al. .................... | 429/179 |

FOREIGN PATENT DOCUMENTS

| KR | 10-2004-0017094 | | 2/2004 | |
| KR | 10-2004-0110535 | | 12/2004 | |
| KR | 1020050036633 | * | 4/2005 | ............. H01M 2/20 |
| KR | 10-0516774 B1 | | 9/2005 | |
| KR | 10-2006-0091788 | | 8/2006 | |
| KR | 1020060091788 | * | 8/2006 | ............. H01M 2/10 |
| KR | 10-0863898 B1 | | 10/2008 | |

OTHER PUBLICATIONS

Machine translation of KR 10-2006-0091788.*
Machine translation of KR 10-2005-0036633.*
Office action dated Apr. 4, 2011 for corresponding Korean Patent Application No. 10-2009-0115146.
Korean Patent Abstracts, Publication No. 10-2005-0036633, dated Apr. 20, 2005, in the name of Chan Hee Lee, corresponding to Korean Patent 10-0516774 listed above.
Korean Patent Abstracts, Publication No. 10-2004-0016701, dated Feb. 25, 2004, in the name of Jung Heon Kim, corresponding to Korean Patent 10-0863898 listed above.

* cited by examiner

*Primary Examiner* — Maria J Laios
(74) *Attorney, Agent, or Firm* — Christie, Parker & Hale, LLP

(57) ABSTRACT

A secondary battery and a battery pack using the same. A secondary battery includes a pouch case containing an electrode assembly therein; an electrode terminal connected to the electrode assembly and including a side end exposed outside the pouch case; and a vent forming unit coupled to the pouch case and configured to form a vent in the pouch case when the pouch case swells.

16 Claims, 3 Drawing Sheets

SECONDARY BATTERY AND BATTERY PACK USING THE SAME

CROSS-REFERENCE TO RELATED APPLICATION

This application claims priority to and the benefit of Korean Patent Application No. 10-2009-0115146, filed on Nov. 26, 2009, the entire content of which is incorporated herein by reference.

BACKGROUND

1. Field

Aspects of embodiments of the present invention relate to a secondary battery and a battery pack using the same.

2. Description of the Related Art

Unlike non-rechargeable primary batteries, secondary batteries are generally rechargeable and are widely used as power sources for portable electronic devices such as cellular phones, notebook computers, and camcorders.

Among various types of secondary batteries, lithium secondary batteries have recently come into widespread use because of their high operating voltages and high energy density per weight. Lithium secondary batteries can take various shapes, including cylinders, cans, and pouches.

A lithium secondary battery largely comprises an electrode assembly including a positive electrode plate, a negative electrode plate and a separator, and a liquid electrolyte interacting with the electrode assembly. Charge and discharge operation of the lithium secondary battery take place by the interaction between the electrode assembly and the liquid electrolyte.

The lithium ion battery may have increased internal temperature or unduly increased internal pressure due to overheating conditions caused by an overcharge, overdischarge, internal short-circuit, released internal gas, and the like, which may induce swelling of the secondary battery, and an abnormal response of the battery may occur.

SUMMARY

According to an aspect of embodiments of the present invention, a secondary battery and a battery pack using the secondary battery have an improved structure capable of preventing or reducing swelling.

According to another aspect of embodiments of the present invention, a secondary battery may form a vent for eliminating or reducing swelling after swelling has occurred in the secondary battery.

According to one embodiment of the present invention, a secondary battery includes a pouch case containing an electrode assembly therein; an electrode terminal connected to the electrode assembly and including a side end exposed outside the pouch case; and a vent forming unit coupled to the pouch case and configured to form a vent in the pouch case when the pouch case swells.

The vent forming unit may be directed toward a side surface of the pouch case.

In one embodiment, the pouch case includes a terrace portion at an end of the pouch case, the electrode terminal protrudes from the terrace portion, and the vent forming unit is mounted to the terrace portion.

The vent forming unit may include a support portion coupled to a side end of the terrace portion, and a pin extending from the support portion and directed toward the side surface of the pouch case. The side surface of the pouch case may be at an oblique angle with respect to the terrace portion.

A flow channel may be formed in the pin, the flow channel extending from a side end of the pin and being in fluidic communication with an exterior portion of the pin.

In one embodiment, the secondary battery further includes a sensor connected to the electrode terminal and configured to detect a voltage drop of the electrode assembly.

The secondary battery may further include a circuit board electrically connected to the sensor and configured to receive information of the voltage drop.

According to another embodiment of the present invention, a secondary battery includes an electrode assembly including a positive electrode plate, a negative electrode plate, and a separator interposed between the positive electrode plate and the negative electrode plate; a pouch case containing the electrode assembly and an electrolyte therein; a pair of electrode terminals connected to the positive electrode plate and the negative electrode plate, respectively, and each including a side end exposed outside the pouch case; and a vent forming unit directed toward a portion of an outer surface of the pouch case, coupled to the pouch case and spaced apart from the portion of the outer surface, and configured to pierce the portion of the outer surface and form a vent in the pouch case when the portion of the outer surface swells. In one embodiment, the secondary battery further includes a sensor connected to the electrode terminals and configured to detect a voltage drop when the vent is formed.

In one embodiment, the pouch case includes a terrace portion extending away from the portion of the outer surface and surrounding parts of the electrode terminals, and the vent forming unit is mounted to the terrace portion.

The vent forming unit may include a support portion clamped to a side end of the terrace portion, and a pin extending from the support portion and directed toward the portion of the outer surface. The portion of the outer surface may be at an oblique angle with respect to the terrace portion.

A flow channel may be formed in the pin, the flow channel extending from a side end of the pin and being in fluidic communication with an exterior portion of the pin.

According to another embodiment of the present invention, a battery pack includes a plurality of secondary batteries, each including a pouch case containing an electrode assembly therein, an electrode terminal connected to the electrode assembly and including a side end exposed outside the pouch case, and a vent forming unit coupled to the pouch case and configured to form a vent in the pouch case when the pouch case swells; a connection unit electrically connecting electrode terminals of neighboring secondary batteries to each other; and a circuit board electrically connected to the connection unit and including a control circuit for charging/discharging of the secondary batteries.

In one embodiment, the battery pack further includes sensors mounted at the electrode terminals for detecting a voltage drop of the respective secondary batteries.

The sensors may be electrically connected to the circuit board.

The battery pack may further include a display or an illuminating device configured to generate outputs corresponding to respective inputs from the sensors.

According to an aspect of embodiments of a secondary battery of the present invention and a battery pack using the same, when swelling occurs, a vent may be formed by piercing the pouch case using a vent forming unit. As a result, over-heating, over-pressure, and/or other abnormal states of the secondary battery may be eliminated or reduced, and moisture may be induced in the secondary battery so as to cause the secondary battery to not operate properly and thereby avoid serious accidents, such as fire or explosion of the battery pack.

Further, according to an aspect of embodiments of the present invention, because a voltage change of the secondary battery operating abnormally due to swelling may be sensed, a secondary battery may be accurately and rapidly selected from among a plurality of secondary batteries of the battery pack for replacement.

BRIEF DESCRIPTION OF THE DRAWINGS

The above and other features and advantages will become more apparent to those of ordinary skill in the art by describing in detail some exemplary embodiments of the present invention with reference to the attached drawings, in which.

DETAILED DESCRIPTION

Certain exemplary embodiments are described more fully herein with reference to the accompanying drawings; however, embodiments of the present invention may be embodied in different forms and should not be construed as limited to the embodiments set forth herein. Rather, these exemplary embodiments are provided by way of example for understanding of the invention and to convey the scope of the invention to those skilled in the art.

Figure 1:
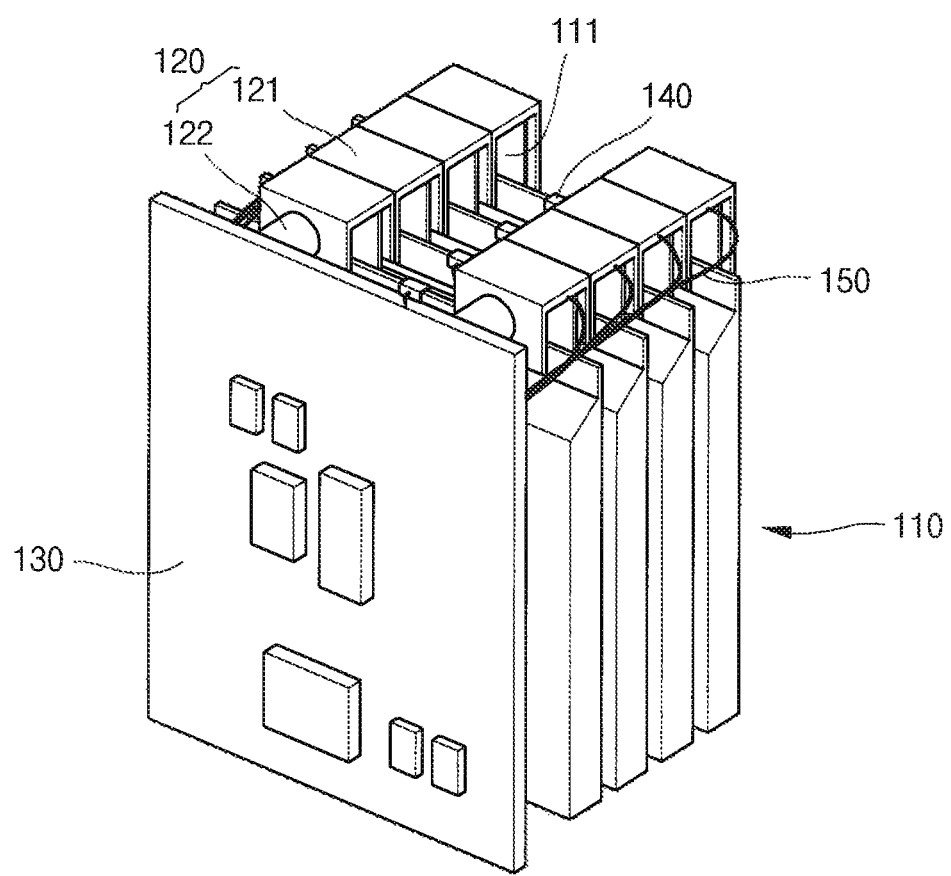
FIG. 1 is an assembled perspective view of a battery pack according to an embodiment of the present invention.

FIG. 1 is an assembled perspective view illustrating a battery pack according to an embodiment of the present invention.

Referring to FIG. 1, the battery pack includes a plurality of secondary batteries 110 stacked on one another. As the number of secondary batteries 110 increases, the charge/discharge capacity of the battery pack may increase accordingly. The battery pack may be a medium- or large-sized battery pack having a plurality of secondary batteries 110, as unit cells, with a high-capacity power supply.

In the battery pack, among the plurality of secondary batteries 110, electrode terminals 111 of the same polarity of neighboring secondary batteries 110 are electrically connected to each other through a connection unit 120. The connection unit 120, in one embodiment, includes connection plates 121 disposed between the neighboring secondary batteries 110, and a connection rod 122 connected to the outermost connection plate 121. The connection unit 120, in one embodiment, is made of a conductive metal, such as copper, having relatively high electrical conductivity compared to other metals.

In one embodiment, a single circuit board 130 is provided, the circuit board 130 having a built-in circuit for controlling charging and discharging of the plurality of secondary batteries 110. The circuit board 130 is electrically connected to the secondary batteries 110 through the connection rod 122. In the above-described embodiment, the plurality of secondary batteries 110 are controlled by the single circuit board 130 such that the circuit of the battery pack may be configured in a simplified manner compared to a battery pack in which a circuit of each of the secondary batteries 110 is independently formed.

A vent forming unit 140, in one embodiment, is mounted on each of the secondary batteries 110, which is described in more detail later herein with reference to FIG. 2.

With further reference to FIG. 1, the circuit board 130, in one embodiment, is connected to sensors 150 inserted into or coupled to the respective electrode terminals 111. The sensors 150 may include electrical wires, and the sensors 150, in one embodiment, are configured to allow a voltage change in each of the secondary batteries 110 to be detected by the circuit board 130.

Figure 2:
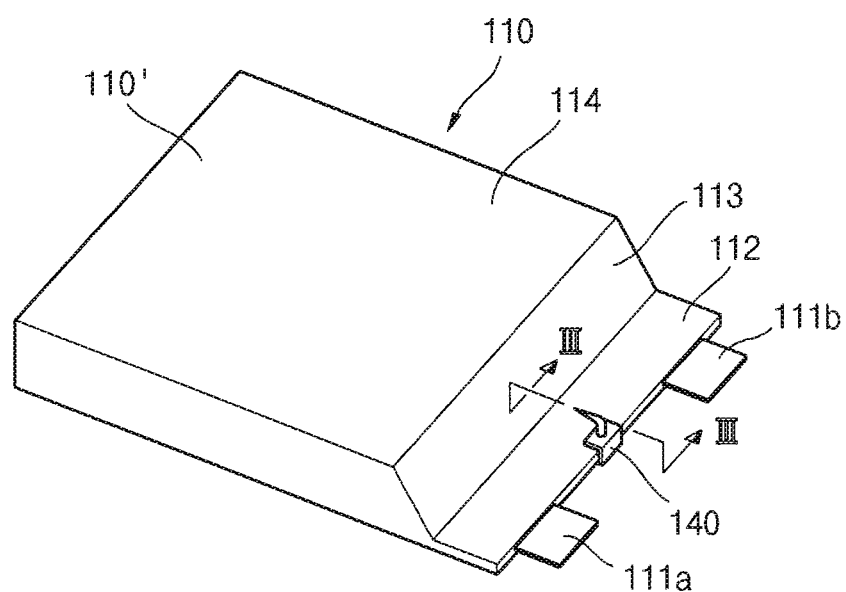
FIG. 2 is an assembled perspective view of a secondary battery among a plurality of secondary batteries constituting the battery pack of FIG. 1.

FIG. 2 is an assembled perspective view illustrating a secondary battery 110, or a unit cell battery, among the plurality of secondary batteries 110 constituting the battery pack of FIG. 1.

Referring to FIG. 2, the secondary battery 110, in one embodiment, includes a pouch case 110', first and second electrode terminals 111a and 111b (electrode terminals 111 of FIG. 1), and a vent forming unit 140.

The pouch case 110', in one embodiment, has an electrode assembly therein (e.g., a built-in electrode assembly) (not shown), and the first and second electrode terminals 111a, 111b are connected to the electrode assembly and extend outside the pouch case 110'. The electrode assembly, in one embodiment, includes a positive electrode plate, a negative electrode plate, and a separator sequentially stacked and wound in a jelly-roll configuration that is accommodated in the pouch case 110', the positive electrode plate having a positive electrode coating portion coated on a surface of a positive electrode collector, the negative electrode plate having a negative electrode coating portion coated on a surface of a negative electrode collector, and the separator being disposed between the positive electrode plate and the negative electrode plate and insulating the positive electrode plate and the negative electrode plate from each other.

The positive electrode collector of the positive electrode plate, in one embodiment, is made of a conductive metal, so that it can collect electrons from the positive electrode coating portion to move the collected electrons to external circuits during charging. The positive electrode coating portion may be prepared by mixing a positive electrode active material, a conductive member, and a binder, and coating the mixture on the positive electrode collector to a predetermined thickness.

The negative electrode collector of the negative electrode plate, in one embodiment, is made of a conductive metal, so that it can collect electrons from the negative electrode coating portion to move the collected electrons to external circuits during discharging. The negative electrode coating portion may be prepared by mixing a negative electrode active material, a conductive member, and a binder, and coating the mixture on the negative electrode collector to a predetermined thickness.

The electrode terminals 111, in one embodiment, are formed to extend outwardly from the inside of the pouch case 110'. The electrode terminals 111 may include the first electrode terminal 111a and the second electrode terminal 111b. The first electrode terminal 111a is electrically connected to the positive electrode plate or the negative electrode plate, such that it may be an electrical cathode or anode. The second electrode terminal 111b is electrically connected to the positive electrode plate or the negative electrode plate, such that it may be an electrode having a polarity electrically opposite to that of the first electrode terminal 111a.

With further reference to FIG. 2, in one embodiment, a terrace 112 is offset from a stacking surface 114 in a depth direction of the pouch case 110' at one end of the pouch case 110'. The terrace 112 may be formed, for example, such that two case parts forming the pouch case 110' are fused to each other, but alternatively, may be formed in any other suitable manner.

The vent forming unit 140 is configured to form a vent in the pouch case 110' when the pouch case 110' swells.

The vent forming unit 140 is installed on, or otherwise coupled to, the pouch case 110'. In one embodiment, the vent forming unit 140 is installed at the terrace 112 and directed toward a side surface 113 of the pouch case 110', the side surface 113 extending between the terrace 112 and the stacking surface 114 which corresponds to an area where the plurality of secondary batteries 110 are stacked on one another in the battery pack, such that the pouch case 110' may swell outwardly at the side surface 113. The side surface 113, in one embodiment, is formed at an oblique angle to the terrace 112 and the stacking surface 114. That is, in one embodiment, the side surface 113 leans toward the one end of the pouch case 110' where the terrace 112 is located in a depth direction of the pouch case 110'. Further, in one embodiment, the vent forming unit 140 is installed between the first and second electrode terminals 111a and 111b.

Although in the illustrated embodiment, it has been shown and described that the battery pack includes a plurality of secondary batteries 110 connected to one single circuit board 130, it will be understood by one skilled in the art that in another embodiment in which only a unit cell secondary battery 110 is used, a smaller-sized circuit board can be used. In this case, the sensors 150 shown in FIG. 1 being connected to the electrode terminals 111 may be connected to the circuit board.

Figure 3:
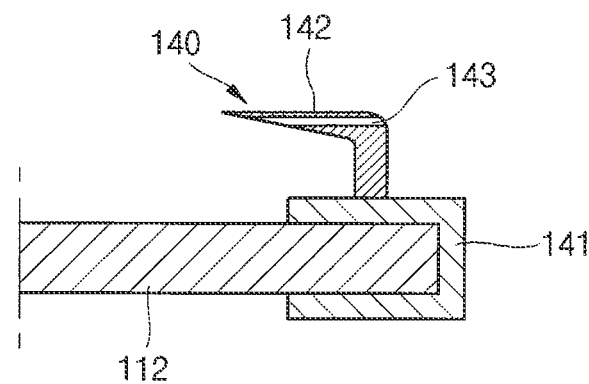
FIG. 3 is a cross-sectional view of a vent forming unit of the secondary battery of FIG. 2 taken along the line III-III.

FIG. 3 is a cross-sectional view of a vent forming unit of the secondary battery of FIG. 2 taken along the line III-III.

Referring to FIG. 3, the vent forming unit 140, in one embodiment, includes a support portion 141 coupled to (e.g., clamped to) a side end of the terrace 112 of the pouch case 110', and a pin 142 extending from the support portion 141 to a side end. In one embodiment, the side end of the pin 142 is directed toward the side surface 113. The support portion 141 supports the pin 142 to be maintained at a predetermined position relative to the pouch case 110', and the pin 142 is configured to pierce the pouch case 110' (e.g., at the side surface 113) when the pouch case 110' swells, thereby forming a vent in the pouch case 110'.

Further, in one embodiment, a flow channel 143 is formed in the pin 142. The flow channel 143, in one embodiment, is formed within the pin 142 in the shape of a cavity and further, in one embodiment, extends from the side end of the pin 142 and is formed to communicate with the exterior of another portion of the pin 142.

Figure 4:
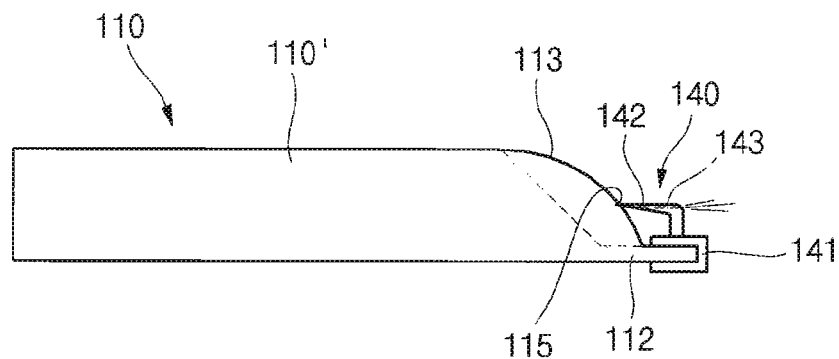
FIG. 4 is a schematic diagram illustrating the operation of the secondary battery of FIG. 2 when swelling occurs in the secondary battery.

FIG. 4 is a schematic diagram illustrating the operation of the secondary battery of FIG. 2 when swelling occurs in the secondary battery.

Referring to FIG. 4, because in the embodiment of the battery pack illustrated in FIG. 1, secondary batteries 110 are stacked on one another, the side surface 113 thereof swells most when swelling occurs. If the side surface 113 swells by at least a certain amount such that it interferes with the pin 142, the side surface 113 is pierced by the pin 142. Consequently, a vent 115 is formed on the side surface 113 such that internal gas may be released from within the pouch case 110' to the outside through the vent 115.

When the pin 142 pierces the pouch case 110', fluids included inside the pouch case 110', such as the internal gas, move in a space between the pouch case 110' and the pin 142 and through the flow channel 143, thereby allowing the internal gas to be released to the outside more rapidly.

Figure 5:
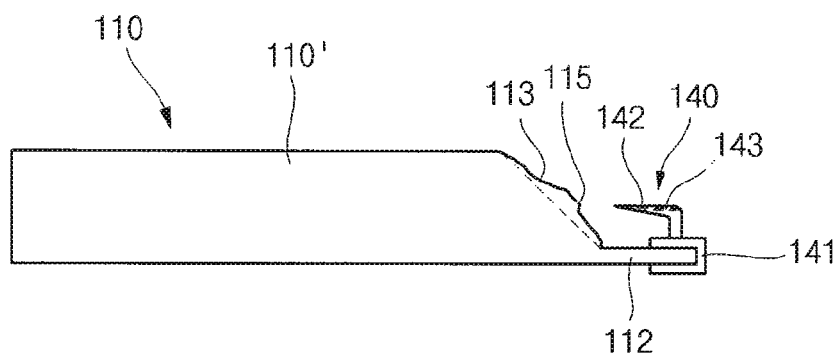
FIG. 5 is a schematic diagram illustrating a state after which the release of internal gas from the secondary battery shown in FIG. 4 has occurred.

FIG. 5 is a schematic diagram illustrating a state after which the release of internal gas from the secondary battery shown in FIG. 4 has occurred.

Referring to FIG. 5, once the internal gas is released by a given extent or greater, the pouch case 110' will return to a contracted state. In this case, however, the pouch case 110' may not fully return to its original state or shape before swelling occurred in the pouch case 110'.

As the pouch case 110' returns to the contracted state, the side surface 113 of the pouch case 110' may again be spaced apart from the pin 142 of the vent forming unit 140. In addition, the vent 115 provides a flow path through which the fluids may be released from the pouch case 110' without being blocked by the pin 142.

Here, foreign, or outside, air may be introduced into the pouch case 110' through the vent 115. The pouch case 110' may be configured to include only a small amount of moisture, such as approximately 1 ppm, for example. Accordingly, the introducing of the foreign air may result in introducing or inducing an additional amount of moisture such that an amount of moisture in the pouch case 110' exceeds an amount of moisture existing inside the pouch case 110' prior to the introducing of the foreign air, which will be described further below with reference to FIG. 6.

Figure 6:
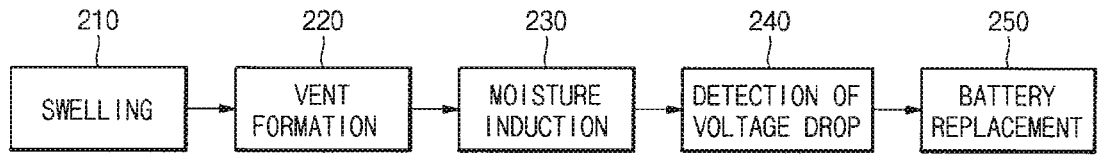
FIG. 6 is a schematic diagram illustrating a process of replacing a secondary battery associated with swelling.

FIG. 6 is a schematic diagram illustrating a process of replacing a secondary battery associated with swelling.

Referring to FIG. 6 together with FIGS. 1 to 5, as described above, when swelling 210 of the secondary battery 110 occurs due to abnormal operation, the pouch case 110' is associated with the vent forming unit 140 (e.g., the vent forming unit 140 pierces the pouch case 110') and vent formation 220 occurs to form the vent 115.

Although the increased pressure inside the pouch case 110' is reduced by forming the vent 115, foreign air may be introduced into the pouch case 110' through the vent 115, and moisture induction 230 may occur in the pouch case 110'. The induced moisture, in one embodiment, reacts with electrolyte, resulting in a drop in the output voltage of the secondary battery 110.

The change in the output voltage, in one embodiment, is detected by the sensors 150 in the detection of voltage drop 240. When a signal indicative of the change in the output voltage is applied, the circuit board 130 determines which one among the plurality of secondary batteries 110 swells and whether the swollen battery operates normally or not. The determination results, in one embodiment, are output through a display connected to the circuit board 130 recognizable by an operator so that battery replacement 250 of the abnormally operating battery may be performed. Alternatively, an electrical "ON" state indicative of the determination result may be accomplished using any other suitable device or illuminator means, other than the display.

Although arrangements and actuation mechanisms in the secondary battery and the battery pack according to the present invention have been illustrated through particular exemplary embodiments, it will be understood by those of ordinary skill in the art that many variations and modifications may be made without departing from the spirit and scope of the present invention as set forth in the following claims, such as by selectively combining all or some of the exemplary embodiments described herein.

What is claimed is:

1. A secondary battery comprising:
   a pouch case containing an electrode assembly therein and comprising a stacking surface, a terrace portion at an end of the pouch case and offset from the stacking surface in a first direction, and a side surface extending between the terrace portion and the stacking surface;
   an electrode terminal connected to the electrode assembly and comprising a side end exposed outside the pouch case, the electrode terminal protruding from the terrace portion in a second direction perpendicular to the first direction; and
   a vent forming unit clamped to an end of the terrace portion and spaced from the side surface in the second direction, the vent forming unit directed toward and configured to form a vent in the side surface when the pouch case swells in the second direction.

2. The secondary battery of claim 1, wherein the vent forming unit comprises:
   a support portion clamped to the end of the terrace portion; and
   a pin extending from the support portion and directed toward the side surface of the pouch case.

3. The secondary battery of claim 2, wherein the side surface of the pouch case is at an oblique angle with respect to the terrace portion.

4. The secondary battery of claim 2, wherein a flow channel is formed in the pin, the flow channel extending from a side end of the pin and being in fluidic communication with an exterior portion of the pin.

5. The secondary battery of claim 1, further comprising a sensor connected to the electrode terminal and configured to detect a voltage drop of the electrode assembly.

6. The secondary battery of claim 5, further comprising a circuit board electrically connected to the sensor and configured to receive information of the voltage drop.

7. A secondary battery comprising:
   an electrode assembly including a positive electrode plate, a negative electrode plate, and a separator interposed between the positive electrode plate and the negative electrode plate;
   a pouch case containing the electrode assembly and an electrolyte therein and comprising a stacking surface, a terrace portion at an end of the pouch case and offset from the stacking surface in a first direction, and a side surface extending between the terrace portion and the stacking surface;
   a pair of electrode terminals connected to the positive electrode plate and the negative electrode plate, respectively, and each comprising a side end exposed outside the pouch case, the electrode terminals protruding from the terrace portion in a second direction perpendicular to the first direction; and
   a vent forming unit directed toward a portion of the side surface of the pouch case, clamped to an end of the terrace portion and spaced apart from the portion of the side surface in the second direction, and configured to pierce the portion of the side surface and form a vent in the pouch case when the portion of the side surface swells in the second direction.

8. The secondary battery of claim 7, further comprising a sensor connected to the electrode terminals and configured to detect a voltage drop when the vent is formed.

9. The secondary battery of claim 7, wherein the terrace portion extends away from the portion of the side surface and surrounds parts of the electrode terminals.

10. The secondary battery of claim 7, wherein the vent forming unit comprises a support portion clamped to the end of the terrace portion, and a pin extending from the support portion and directed toward the portion of the side surface.

11. The secondary battery of claim 10, wherein the portion of the side surface is at an oblique angle with respect to the terrace portion.

12. The secondary battery of claim 10, wherein a flow channel is formed in the pin, the flow channel extending from a side end of the pin and being in fluidic communication with an exterior portion of the pin.

13. A battery pack comprising:
   a plurality of secondary batteries stacked in a first direction, each comprising;
      a pouch case containing an electrode assembly therein and comprising a stacking surface, a terrace portion at an end of the pouch case and offset from the stacking surface in the first direction, and a side surface extending between the terrace portion and the stacking surface;
      an electrode terminal connected to the electrode assembly and comprising a side end exposed outside the pouch case, the electrode terminal protruding from the terrace portion in a second direction perpendicular to the first direction; and
      a vent forming unit clamped to an end of the terrace portion and spaced from the side surface in the second direction, the vent forming unit directed toward and configured to form a vent in the side surface when the pouch case swells in the second direction;
   a connection unit electrically connecting electrode terminals of neighboring secondary batteries to each other; and
   a circuit board electrically connected to the connection unit and comprising a control circuit for charging/discharging of the secondary batteries.

14. The battery pack of claim 13, further comprising sensors mounted at the electrode terminals for detecting a voltage drop of the respective secondary batteries.

15. The battery pack of claim 14, wherein the sensors are electrically connected to the circuit board.

16. The battery pack of claim 15, further comprising a display or an illuminating device configured to generate outputs corresponding to respective inputs from the sensors.

* * * * *